April 2, 1957     A. KUSKO     2,787,733
POWER DISTRIBUTION SYSTEM
Filed Feb. 13, 1953
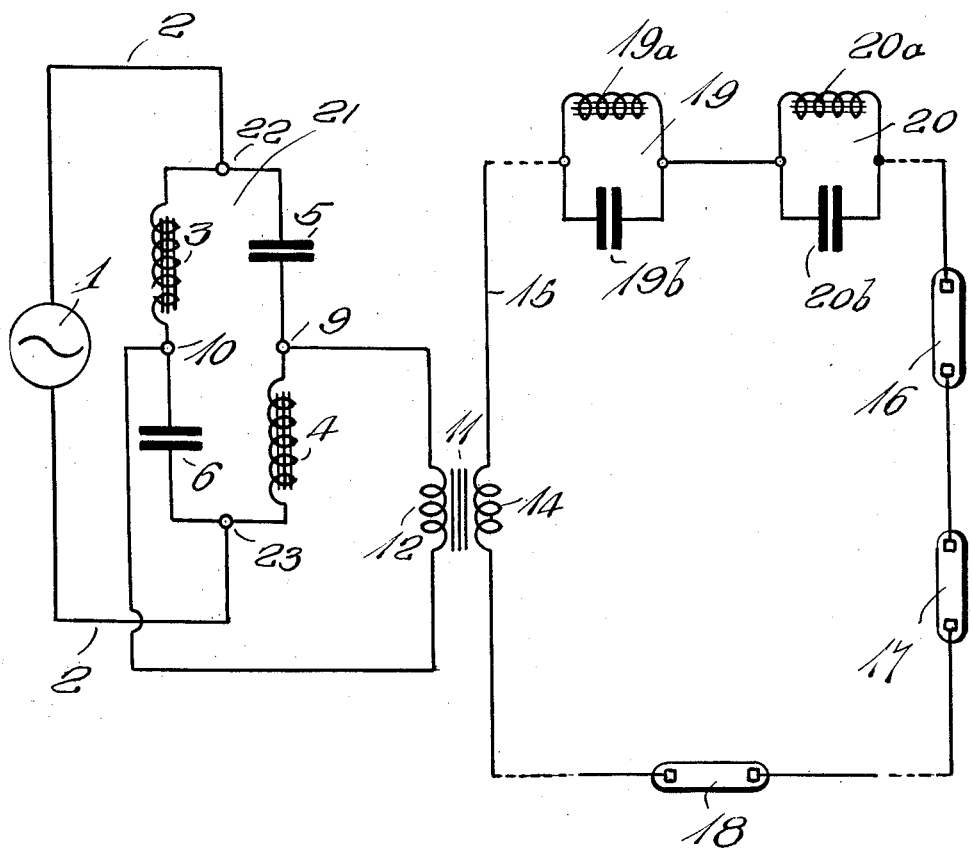
INVENTOR
Alexander Kusko,
BY John B. Brady
ATTORNEY 2,787,733

POWER DISTRIBUTION SYSTEM

Alexander Kusko, Brighton, Mass., assignor to Hevi Duty Electric Company, Milwaukee, Wis., a corporation of Wisconsin Application February 13, 1953, Serial No. 336,714

3 Claims. (Cl. 315—189)

My invention relates broadly to electric power distribution systems and more particularly to constant-current power distribution systems for non-linear electrical loads.

One of the objects of my invention is to provide a circuit arrangement for distributing electrical power to power distribution circuits employing non-linear loads, including means for suppressing harmonic currents and limiting the peak-to-root mean square ratio of the load current and the possible telephone interference offered by the load circuit.

Another object of my invention is to provide a circuit arrangement for distributing power to non-linear loads in which excessive values of peak-to-root mean square ratio of the load current are prevented.

Another object of my invention is to provide an electric power distribution circuit for supplying alternating current from a generator system to a non-linear load with parallel resonant harmonic filters interposed between the generator circuit and the load for cutting down or reducing the load peak to a safe value under conditions in which harmonic currents may be produced in the generator circuit.

Still another object of my invention is to provide an arrangement of filters tuned to the third and fifth harmonics of an alternating current power supply system and interposed between the system and the load and coacting to cut down or reduce the harmonic amplitude of the generated currents for preventing the feeding of excess currents to the load or the interference of the generator system with adjacent communication circuits.

Other and further objects of my invention reside in a circuit arrangement for the connection of harmonic filters between an alternating current generation system and a non-linear load, as set forth more fully in the specification hereinafter following by reference to the accompanying drawing which diagrammatically illustrates my invention in connection with a non-linear load of the mercury vapor lamp type.

Referring to the drawings in more detail, reference character 1 designates an alternating-current power supply source such as a 110-volt, 60-cycle alternator delivering constant voltage to the power supply circuit 2—2 across which there is connected a closed loop 21 tuned circuit formed in two branches. One branch includes reactor 3 and capacitor 6. The other branch includes capacitor 5 and reactor 4. The constant voltage from line 2—2 is transformed into constant current in these parallel tuned circuits having the same frequency as the supply voltage.

The closed loop tuned circuit 21 has input terminals 22 and 23 to which the alternator 1 connects. These input terminals are arranged at the opposite ends of the branch circuits. The output terminals 9 and 10 are disposed intermediate the reactor and capacitor in each of the branch circuits.

The load circuit connects at terminals 9 and 10 of the parallel tuned circuits and connects to the power distribution transformer system represented generally at 11 as including primary winding 12 connected to the power supply circuit extending from terminals 9 and 10 and a secondary winding 14 connected to the power distribution circuit shown generally at 15. The power distribution circuit 15 connects to the non-linear load represented by gaseous discharge type lamps 16, 17 and 18.

Gaseous discharge type lamps are basically non-linear in that neither the ratio of the instantaneous voltage-to-current over a cycle, or the ratio of effective voltage-to-current are linear as it is in a normal resistive device. As a consequence, when these lamps are connected in series, and without ballast, to a static constant-current regulator of the mono-cyclic square type, the waveform of the voltage across the lamp and the current through the lamp are not sinusoidal, i. e., they are both rich in harmonics. As a matter of fact, the lamp current is highly peaked.

The lamp current can produce two ill effects: It can cause the lamp to have a short life because of the high peak in the current waveform; and, the harmonics in the lamp current and in the distribution and feeder lines may cause telephone interference with adjacent telephone circuits.

In order to correct for these disadvantages, I arrange inductance-capacity harmonic filters in the power distribution circuit as represented at 19 and 20. The inductance-capacity harmonic filter 19 includes inductance or reactance 19$a$ and capacity 19$b$ connected in parallel. The filter 20 comprises parallel connected inductance or reactance 20$a$ and capacity 20$b$. Filter 19 is tuned to the third harmonic of the power frequency and filter 20 is tuned to the fifth harmonic of the power frequency. These harmonics have been found to be the principal offending harmonics and the filters 19 and 20 present a high impedance to these harmonic currents and thus prevent the effective current in the power distribution circuit 15 from increasing materially above the nominal value. The filters 19 and 20 are so designed that they cut the lamp current peak down to a safe value and/or reduce the harmonic amplitude in such a way that interference with communication circuits is substantially eliminated.

I have found the arrangement of harmonic filters highly effective, and while I have described a preferred embodiment of my invention, I realize that modifications may be made, and I desire that it be understood that no limitations upon my invention are intended other than may be imposed by the scope of the appended claims.

What I claim as new and desire to secure by Letters Patent of the United States is as follows:

1. A power distribution system comprising an alternator, a closed loop circuit including a pair of branch circuits connected in parallel, each branch circuit including a reactor and a capacitor electrically connected in series, input terminals for said loop circuit at opposite ends of said branch circuits, output terminals for said loop circuit intermediate the reactor and capacitor in each of said branch circuits, connections between said alternator and said input terminals, a power transformer including primary and secondary windings, connections between said primary winding and said output terminals, a power distribution circuit connected with the secondary of said power transformer, a gaseous discharge type lamp means having electrodes in said power distribution circuit, and means connected in said power distribution circuit intermediate said gaseous discharge type lamp means and the secondary winding of said power transformer offering high impedance to harmonic frequencies limiting the peaks of lamp current developed in said power distribution circuit so as to prevent deterioration of said lamp electrodes.

2. A power distribution system, as set forth in claim 1, in which said means consists of separate filter circuits each constituted by a reactance shunted by a capacitor, the said filter circuits being electrically connected in series intermediate the secondary winding of said power transformer and the gaseous discharge type lamp means, said filter circuits coacting to mutually reduce the amplitude of harmonic currents in said power distribution system.

3. A power distribution system, as set forth in claim 1, in which said means comprises a pair of filter circuits connected between said secondary winding and said gaseous discharge type lamp means, one of said filter circuits being tuned to the third harmonic of the frequency of said alternator and the other of said filter circuits being tuned to the fifth harmonic of the frequency of said alternator, said filter circuits mutually coacting to reduce the harmonic amplitude in said power distribution circuit.

References Cited in the file of this patent

UNITED STATES PATENTS

| | | |
|---|---|---|
| 1,382,877 | Alexanderson | June 28, 1921 |
| 2,099,716 | Young | Nov. 23, 1937 |
| 2,312,416 | Johnson | Mar. 2, 1943 |

FOREIGN PATENTS

| | | |
|---|---|---|
| 291,529 | Great Britain | June 5, 1928 |
| 466,682 | Germany | Oct. 12, 1928 |